US 9,195,810 B2

(12) United States Patent
Kirovski et al.

(10) Patent No.: US 9,195,810 B2
(45) Date of Patent: Nov. 24, 2015

(54) IDENTIFYING FACTORABLE CODE

(75) Inventors: Darko Kirovski, Kirkland, WA (US);
Benjamin Livshits, Kirkland, WA (US);
Gennady Medvinsky, Redmond, WA (US); Vijay Gajjala, Sammamish, WA (US); Kenneth Ray, Seattle, WA (US);
Jesper Lind, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 12/979,933

(22) Filed: Dec. 28, 2010

(65) Prior Publication Data

US 2012/0167061 A1 Jun. 28, 2012

(51) Int. Cl.
*G06F 9/45* (2006.01)
*G06F 21/12* (2013.01)

(52) U.S. Cl.
CPC ...... *G06F 21/125* (2013.01); *G06F 2221/2115* (2013.01)

(58) Field of Classification Search
None
See application file for complete search history.

(56) References Cited

U.S. PATENT DOCUMENTS

| 5,295,187 | A | | 3/1994 | Miyoshi | |
|---|---|---|---|---|---|
| 5,572,589 | A | | 11/1996 | Waters et al. | |
| 5,778,230 | A | * | 7/1998 | Wimble et al. | 717/131 |
| 5,812,850 | A | * | 9/1998 | Wimble | 717/131 |
| 5,984,366 | A | | 11/1999 | Priddy | |
| 6,070,009 | A | * | 5/2000 | Dean et al. | 717/132 |
| 6,374,402 | B1 | * | 4/2002 | Schmeidler et al. | 717/167 |
| 6,397,380 | B1 | * | 5/2002 | Bittner et al. | 717/151 |
| 6,567,914 | B1 | | 5/2003 | Just et al. | |
| 6,668,015 | B1 | | 12/2003 | Kranawetter et al. | |
| 6,668,325 | B1 | | 12/2003 | Collberg et al. | |

(Continued)

FOREIGN PATENT DOCUMENTS

| CA | 2434538 | 10/2002 |
|---|---|---|
| JP | 2008-523537 A | 7/2008 |

(Continued)

OTHER PUBLICATIONS

Yoshiki Higo et al., "Refactoring Support Based on Code Clone Analysis", Graduate School of Information Science and Technology, Osaka Japan, 2005, <Refactoring Support Based on Code Clone Analysis>, pp. 1-14.*

(Continued)

*Primary Examiner* — Thuy Dao
*Assistant Examiner* — Samuel Hayim
(74) *Attorney, Agent, or Firm* — Timothy Churna; Judy Yee; Micky Minhas

(57) ABSTRACT

Various embodiments are disclosed that relate to the automated identification of one or more computer program functions for potentially placing on a remote computing device in a split-computational computing environment. For example, one disclosed embodiment provides, on a computing device, a method of determining a factorable portion of code to locate remotely from other portions of the code of a program to hinder unauthorized use and/or distribution of the program. The method includes, on a computing device, receiving an input of a representation of the code of the program, performing analysis on the representation of the code, the analysis comprising one or more of static analysis and dynamic analysis, and based upon the analysis of the code, outputting a list of one or more functions determined from the analysis to be candidates for locating remotely.

20 Claims, 2 Drawing Sheets

(56) References Cited

U.S. PATENT DOCUMENTS

| | | | |
|---|---|---|---|
| 6,747,930 B1 | 6/2004 | Weldon et al. | |
| 6,807,548 B1* | 10/2004 | Kemper | 1/1 |
| 7,003,131 B2 | 2/2006 | Watson et al. | |
| 7,065,634 B2* | 6/2006 | Lewis et al. | 717/132 |
| 7,076,660 B2 | 7/2006 | Newman | |
| 7,376,073 B2 | 5/2008 | Hart, III et al. | |
| 7,451,439 B2* | 11/2008 | Nickell et al. | 717/159 |
| 7,596,778 B2* | 9/2009 | Kolawa et al. | 717/126 |
| 7,627,861 B2* | 12/2009 | Smith et al. | 717/144 |
| 7,681,190 B2 | 3/2010 | Venkatesan et al. | |
| 7,992,001 B2* | 8/2011 | Granados et al. | 713/171 |
| 8,166,464 B2* | 4/2012 | Lin et al. | 717/133 |
| 8,239,967 B2* | 8/2012 | McMichael et al. | 726/30 |
| 2001/0018743 A1 | 8/2001 | Morishita | |
| 2001/0033659 A1 | 10/2001 | Eisenberg | |
| 2002/0026602 A1 | 2/2002 | Edelkind | |
| 2002/0059567 A1* | 5/2002 | Minamide et al. | 717/151 |
| 2002/0059568 A1* | 5/2002 | Kawahito et al. | 717/151 |
| 2002/0067674 A1 | 6/2002 | Schneck et al. | |
| 2002/0084405 A1 | 7/2002 | Matsumoto et al. | |
| 2002/0104071 A1* | 8/2002 | Charisius et al. | 717/109 |
| 2002/0111997 A1* | 8/2002 | Herlihy | 709/203 |
| 2002/0114265 A1 | 8/2002 | Hart, III et al. | |
| 2002/0136121 A1 | 9/2002 | Salmonsen et al. | |
| 2002/0152436 A1 | 10/2002 | O'Dea | |
| 2002/0166096 A1 | 11/2002 | Shieh | |
| 2002/0188566 A1 | 12/2002 | Inchalik et al. | |
| 2003/0053656 A1 | 3/2003 | Levy | |
| 2003/0154376 A1 | 8/2003 | Hwangbo | |
| 2003/0177472 A1* | 9/2003 | de Jong | 717/131 |
| 2004/0103402 A1* | 5/2004 | Bera | 717/132 |
| 2004/0143742 A1* | 7/2004 | Muratani | 713/176 |
| 2004/0153941 A1* | 8/2004 | Muratani | 714/746 |
| 2004/0168025 A1 | 8/2004 | Carson | |
| 2005/0008812 A1 | 1/2005 | Jackson et al. | |
| 2005/0086631 A1* | 4/2005 | Nakaike et al. | 717/100 |
| 2005/0099612 A1 | 5/2005 | Kirovski | |
| 2005/0108538 A1 | 5/2005 | Howard et al. | |
| 2005/0166193 A1* | 7/2005 | Smith et al. | 717/143 |
| 2005/0183072 A1* | 8/2005 | Horning et al. | 717/140 |
| 2005/0210255 A1 | 9/2005 | Kirovski | |
| 2006/0123384 A1* | 6/2006 | Nickell et al. | 717/100 |
| 2006/0130128 A1* | 6/2006 | Gorancic et al. | 726/9 |
| 2006/0153052 A1 | 7/2006 | Meerwald et al. | |
| 2006/0158976 A1 | 7/2006 | Fukunaga et al. | |
| 2006/0190800 A1 | 8/2006 | Sollish et al. | |
| 2006/0236254 A1* | 10/2006 | Mateescu et al. | 715/762 |
| 2006/0236274 A1* | 10/2006 | Baumgartner et al. | 716/3 |
| 2006/0241999 A1* | 10/2006 | Tsyganskiy et al. | 705/9 |
| 2006/0242188 A1* | 10/2006 | Tsyganskiy et al. | 707/102 |
| 2006/0242196 A1* | 10/2006 | Tsyganskiy et al. | 707/103 Y |
| 2006/0242197 A1* | 10/2006 | Tsyganskiy et al. | 707/103 Y |
| 2006/0242207 A1* | 10/2006 | Tsyganskiy et al. | 707/203 |
| 2007/0234058 A1 | 10/2007 | White | |
| 2007/0280095 A1 | 12/2007 | Yoshida et al. | |
| 2008/0137848 A1 | 6/2008 | Kocher et al. | |
| 2008/0172560 A1 | 7/2008 | Hughes | |
| 2008/0172686 A1 | 7/2008 | Selinfreund | |
| 2008/0252463 A1 | 10/2008 | Andrechak et al. | |
| 2008/0263366 A1 | 10/2008 | G | |
| 2008/0273435 A1 | 11/2008 | Kirovski et al. | |
| 2008/0320444 A1* | 12/2008 | Meijer et al. | 717/110 |
| 2009/0063867 A1* | 3/2009 | Granados et al. | 713/187 |
| 2009/0063868 A1* | 3/2009 | Granados et al. | 713/187 |
| 2009/0150296 A1 | 6/2009 | Kirovski et al. | |
| 2009/0158044 A1 | 6/2009 | Kirovski | |
| 2009/0183263 A1* | 7/2009 | McMichael et al. | 726/27 |
| 2009/0196140 A1 | 8/2009 | Yamaoka et al. | |
| 2009/0202071 A1 | 8/2009 | Kato | |
| 2009/0222799 A1* | 9/2009 | Stewart et al. | 717/143 |
| 2009/0276762 A1* | 11/2009 | Ponitsch | 717/127 |
| 2009/0328002 A1* | 12/2009 | Lin et al. | 717/120 |
| 2010/0077380 A1* | 3/2010 | Baker et al. | 717/120 |
| 2010/0214894 A1 | 8/2010 | Kirovski et al. | |
| 2011/0002209 A1 | 1/2011 | Kirovski et al. | |
| 2011/0083118 A1* | 4/2011 | Moore | 717/110 |
| 2011/0138362 A1* | 6/2011 | Keidar-Barner et al. | 717/126 |

FOREIGN PATENT DOCUMENTS

| | | |
|---|---|---|
| WO | WO97/43853 | 11/1997 |
| WO | WO02/082429 | 10/2002 |
| WO | WO2004/057580 | 7/2004 |
| WO | WO2004/072782 | 8/2004 |
| WO | WO2008/116162 | 9/2008 |

OTHER PUBLICATIONS

Eduardo Martins Guerra et al., "Refactoring Test Code Safely", IEEE, 2007, <http://ieeexplore.ieee.org/stamp/stamp.jsp?tp=&arnumber=4299925>, pp. 1-6.*

Perter Sommerlad et al., "Retaining Comments when Refactoring Code", ACM, 2008, <http://delivery.acm.org/10.1145/1450000/1449817/p653-sommerlad.pdf>, pp. 1-9.*

Martin Fowler et al., "Refactoring: Improving the Design of Existing Code", ACM, 2000, <http://codecourse.sourceforge.net/materials/Refactoring-Presentation-from-JavaOne.pdf>, pp. 1-71.*

Eduardo Guerra et al., "Refactoring Test Code Safely", IEEE, 2007, <http://ieeexplore.ieee.org/stamp/stamp.jsp?tp=&arnumber=4299925>, pp. 1-6.*

Frank Eliassen et al., "Distributed Applications and Interoperable Systems", Springer, 2006, <http://download.springer.com/static/pdf/802/bok%253A978-3-540-35127-6.pdf?auth66=1418761582_58c36f470ee5c6f13a7af1b172b7cf85&ext=.pdf>, pp. 1-365.*

Eli Tilevich et al., "Binary Refactoring: Improving Code Behind the Scenes", ACM, 2005, <http://yanniss.github.io/binary-refactoring04.pdf>, pp. 1-10.*

Norihiro Yoshida et al., "On Refactoring Support Based on Code Clone Dependency Relation", IEEE, 2005, <http://ieeexplore.ieee.org/stamp/stamp.jsp?tp=&arnumber=1509294>, pp. 1-10.*

Martin Kropp et al., "Reverse Generation and Refactoring of Fit Acceptance Tests for Legacy Code", ACM, 2009, <http://delivery.acm.org/10.1145/1640000/1639961/p659-kropp.pdf>, pp. 1-6.*

Anand et al., "A Flexible Security Model for Using Internet Content", Proceedings of the 16th Symposium on Reliable Distributed Systems (SRDS '97), IEEE, 1997, pp. 1-8.

Brodkin, John, "Software Revenue to Rise 8% in 2008, Gartner Predicts," retrieved at <<http://www.networkworld.com/news/2008/021408-gartner-software-revenue-2008.html>>, Network World, Feb. 14, 2008, 3 pages.

Dejean, et al., "RF-DNA: Radio-Frequency Certificates of Authenticity," Cryptographic Hardware and Embedded Systems, 2007, 14 pages.

DVD Technology Training, part 1, DVD Format & Process Training, Vencil Wells, AudioDev AB, Malmo, Sweden, pp. 1-31, retrieved Dec. 2009.

DVD Technology Training, part 2, DVD Parameter Training, Vencil Wells, AudioDev AB, Malmo, Sweden, pp. 1-51, retrieved Dec. 2009.

"Entertainment Software Association, Industry Facts," The Entertainment Software Association, 2009, 1 page.

Finn, David, "How Technology Can Help in Fighting Counterfeiting and Piracy," Third Global Congress on Combating Counterfeiting and Piracy, Geneva Switzerland, Jan. 31, 2007, 10 pages.

Friedlander, Joshua P., "RIAA 2008 Year-End Shipment Statistics," Recording Industry Association of America, 2008, 2 pages.

Hefflinger, Mark, Report: DVD Sales Drop 5.5% in 2008, Digital MediaWare Daily, Jan. 8, 2009, 4 pages.

"IEEE P1363a / D4 (Draft Version 4), Standard Specifications for Public Key Cryptography: Additional Techniques," IEEE, Piscataway, NJ, May 22, 2000, 78 pages.

Jablon, David, "IEEE 1363-2000: Standard Specifications for Public Key Cryptography," NIST Key Management Workshop, Nov. 1-2, 2001, 26 pages.

Jonker, et al., "Digital Rights Management in Consumer Electronics Products," IEEE Signal Processing Magazine, vol. 21, Issue 2, Mar. 2004, pp. 82-91.

(56) References Cited

OTHER PUBLICATIONS

Kaliski, Burt, "IEEE P1363: Standard Specifications for Public-Key Cryptography," retrieved at <<http://grouper.ieee.org/groups/1363/P1363/presentation/P1363-Presentation-8-17-99.pdf>>, Aug. 17, 1999, 45 pages.

Kirovski, Darko, "A Point-Set Compression Heuristic for Fiber-Based Certificates of Authenticity," Proceedings of the Data Compression Conference, 2005, 10 pages.

Kirovski, Darko, "Optical DNA V2.0," retrieved on Jan. 25, 2010, 15 pages.

Magiera, Marcy, "Worldwide Packaged Media Up 6% in 2008," Video Business, Jan. 21, 2009, 3 pages.

"Microsoft Financial Data At"; http://finance.yahoo.com; retrieved Dec. 10, 2009; 2 pages.

"Postscribed ID," Sony DADC, Sony Corporation, Tokyo, Japan, retrieved on Dec. 10, 2009, 1 page.

"Postscribed ID™ Technical Factsheet," Sony Corporation, Tokyo, Japan, Mar. 2009, 4 pages.

Potlapally, Nachiketh, R., "Optical Fingerprinting to Protect Data: A Proposal," Computer, vol. 35, No. 4, Apr. 2002, pp. 23-28.

"Sixth Annual BSA-IDC Global Software 08 Piracy Study," Business Software Alliance, May 2009, 24 pages.

Slattery, et al., "Stability Comparison of Recordable Optical Discs—A Study of Error Rates in Harsh Conditions," Journal of Research of the National Institute of Standards and Technology; vol. 109, No. 5, Sep.-Oct. 2004, pp. 517-524.

"Standard ECMA—267, 120 mm DVD—Read-Only Disk," $3^{rd}$ Edition, Apr. 2001, 96 pages.

"Standard ECMA—335 Common Language Infrastructure (CLI) Partitions I to IV"; Dec. 2001; 440 pages.

"Standard ECMA—359 80 mm (1,46 Gbytes per side) and 120 mm (4,70 Gbytes per side) DVD Recordable Disk (DVD-R)"; 1st Edition; Dec. 2004; 149 pages.

Tuyls, et al., "RFID-Tags for Anti-Counterfeiting," The Cryptographer's Track at the RSA Conference 2006, San Jose, CA, 2006, 17 pages.

Vijaywargi, et al., "Optical DNA"; Lecture Notes in Computer Science, vol. 5628, Financial Cryptography and Data Security: 13th International Conference, Feb. 23-26, 2009, 8 pages.

"Worldwide Video Game Sales Hit $32 Billion in 2008, Top DVD, Blu-Ray for First Time," Game Daily, Jan. 26, 2009, 1 page.

Zhang et al.; "Hiding Program Slices for Software Security"; 1st Annual IEEE/ACM International Symposium on Code Generation and Optimization; Apr. 2003; pp. 325-336.

Zhang, et al.; "Software Piracy Prevention: Splitting on Client"; International Conference on Security Technology; 2008; pp. 62-65.

PCT Patent Appln. PCT/US2008/057842; International Search Report dated Jun. 27, 2008; 3 pages.

PCT Patent Appln. PCT/US2010/040853; International Search Report and Written Opinion dated Feb. 1, 2011; 9 pages.

Hou, et al., "Three control flow obfuscation methods for Java software", Retrieved at << http://winifredwaterbury.net/PRG420/WeekThree/20993047.pdf >>, IEE Proc.-Softw., vol. 153, No. 2 Apr. 2006, pp. 80-86.

Zhang, et al., "Hiding Program Slices for Software Security", Retrieved at << http://www.vodun.org/papers/slicing/Slicing.pdf >>, Apr. 2003, pp. 12.

Tsai, et al., "A Graph Approach to Quantitative Analysis of Control-Flow Obfuscating Transformations", Retrieved at << http://ieeexplore.ieee.org/stamp/stamp.jsp?tp=&arnumber=4783097 >>, IEEE Transactions on information Forensics and security, vol. 4, No. 2, Jun. 2009, pp. 257-267.

Zhang, et al., "Software Piracy Prevention: Splitting on Client", Retrieved at << http://ieeexplore.ieee.org/stamp/stamp.jsp?tp=&arnumber=4725345 >>, International Conference on Security Technology, 2008, pp. 62-65.

Chinese Patent Application 201080031040.2; First Office Action dated Nov. 5, 2012; 8 pages, pp. 1-3 only.

Chinese Patent Application 201080031040.2; Second Office Action dated Jan. 14, 2013; 6 pages, pp. 1-3 only.

CN Notice on the Third Office Action for Application No. 201080031040.2, Apr. 24, 2013, pp. 1-3 only.

"First Office Action and Search Report" From: Chinese Patent Application No. 201110449093.2, Mailed Date: Apr. 3, 2014.

"Second Office Action" From: Chinese Patent Application No. 201110449093.2, Mailed Date: Oct. 29, 2014.

"Response to First Office Action" From: Chinese Patent Application No. 201110449093.2, Filed: Aug. 18, 2014.

"Response to Second Office Action" From: Chinese Patent Application No. 201110449093.2, Filed: Jan. 13, 2015.

"Third Office Action" From: Chinese Patent Application No. 201110449093.2, Mailed Date: Mar. 12, 2015.

"Third Office Action," From Chinese Patent Application No. 201110449093.2, Mailed Mar. 12, 2015, 7 pages.

Response filed May 22, 2015 to Third Office Action, From China Patent Application No. 201110449093.2, 9 pages.

Notice of Allowance mailed Aug. 6, 2015 from China Patent Application No. 201110449093.2, pages, pp. 1-2 and 5-6 only.

\* cited by examiner

IDENTIFYING FACTORABLE CODE

BACKGROUND

Computer programs for personal computers are prone to reverse engineering. For example, license enforcement code in such programs may be detected and disabled by editing a program's machine code. As a consequence, once a computer program hits the market, adversarial users may reverse engineer its protection mechanism and produce a new copy that appears functionally equivalent to the genuine copy, but with disabled anti-piracy enforcement.

Recent developments in anti-piracy technology have led to the development of split computational anti-piracy methods. Split computational methods involve partitioning, or factoring, a program into two or more pieces that are executed remotely from one another. For example, in some implementations, a smaller, functionally important piece of a program is located on a server, while the remainder of the program is located on a client. The client executes the program up to a point where the control flow leads to the server partition. The client then may prepare the appropriate data as input and make a remote procedure call to the functionality present at the server. If the client copy of the program is authorized, the server executes the call and returns results to the client. On the other hand, if the client copy is not authorized or if the server detects tampering attempts, the server will refuse to execute the call or will execute the call differently than it would for authorized clients, thereby disrupting execution of the program on the client.

SUMMARY

Various embodiments are disclosed that relate to the automated identification of one or more computer program functions for potentially placing on a remote computing device in a split-computational computing environment. For example, one disclosed embodiment provides, on a computing device, a method of determining a factorable portion of code to locate remotely from other portions of the code of a program to hinder unauthorized use of the program. The method comprises, on a computing device, receiving an input of a representation of the code of the program, performing analysis on the representation of the code, the analysis comprising one or more of static analysis and dynamic analysis, and based upon the analysis of the code, outputting a list of one or more functions determined from the analysis to be candidates for locating remotely.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
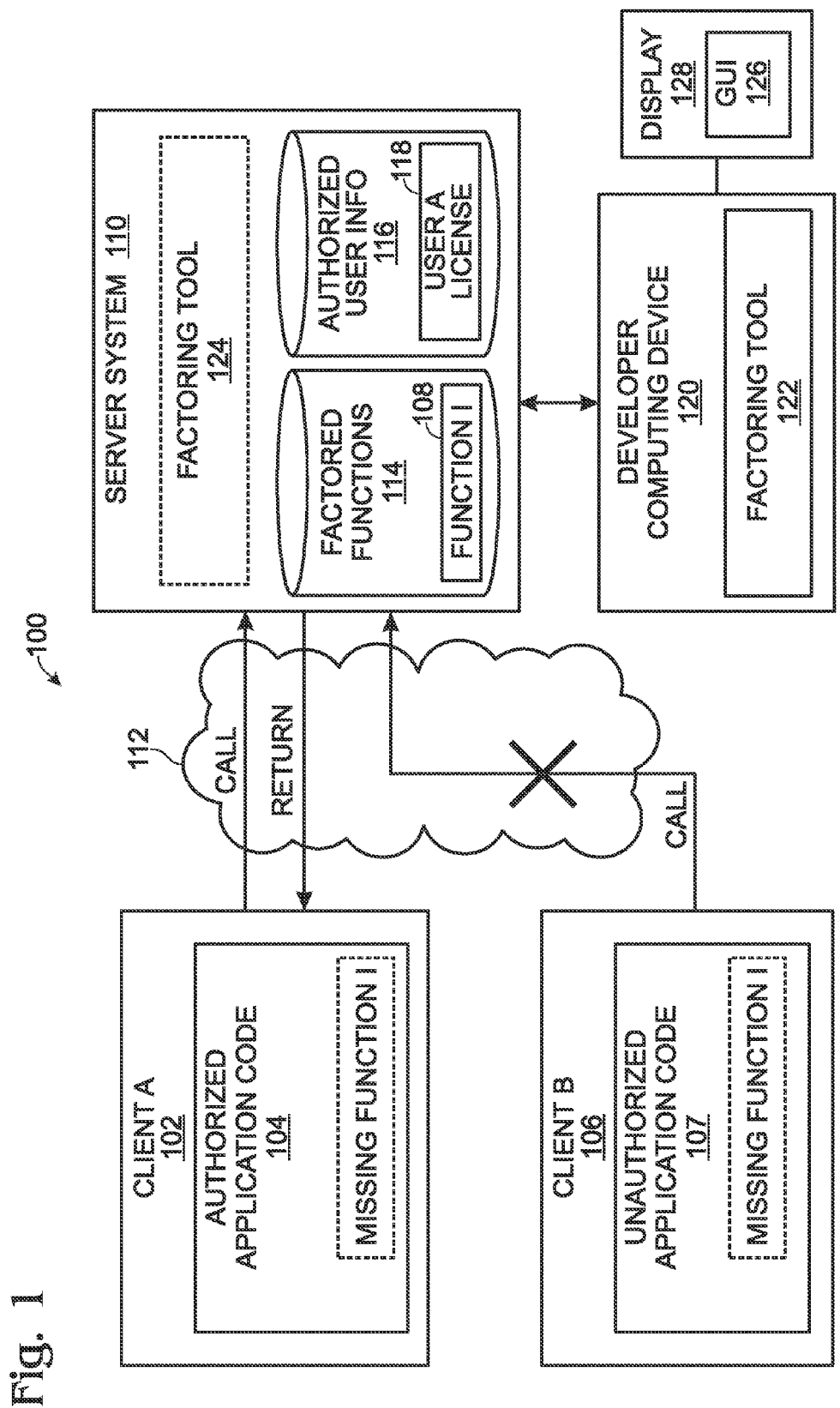
FIG. 1 shows an embodiment of an example of a use environment for a factored program.

When seeking a portion of code to locate remotely from another portion of code for anti-piracy concerns, it may be difficult to locate code that, when factored, effectively prevents piracy yet does not impact the performance of authorized versions of the program to a detrimental extent. This task may be particularly difficult for large, complex applications such as video games. For example, it is desirable for the remotely-located factored code to have a functionality that is hard to infer such that, when provided with known inputs, the code provides outputs that are not easily correlated to the inputs. Also, it is desirable for the absence of the factored code to have a sufficiently negative impact on the performance of the program that trapping the factored code would be significantly degrading to the quality of the user experience provided by the program. These concerns may favor the factoring of relatively large and/or complex functions.

On the other hand, it is not desirable for the moving of the factored code to a remote network location to be overly detrimental to the experience of a user of an authorized version of the application. For example, it is desirable to control latency of round trip time and data delivery back and forth between the client and the server, and to reduce computing resource and/or economic costs associated with hosting the factored code on the server. These concerns may favor the factoring of relatively small and/or simple functions.

In light of these conflicting concerns, embodiments are disclosed that relate to the automated identification of functions in an application for factoring that may balance such concerns. Embodiments are also disclosed herein that relate to presenting a list of such to a user to allow human validation of a final selection of one or more functions for partitioning. It will be understood that the term "function" and the like as used herein to describe factored code may signify any code portion separated from the rest of a program. Prior to discussing the automated identification of code portions, an embodiment of an example use environment is described with reference to FIG. 1. Use environment 100 comprises a first client device, client A 102, on which an authorized copy of program code 104 is running, and a second client 106 on which an unauthorized copy 107 of the program code is running.

Both the authorized and unauthorized versions of the program code are missing one or more functions that instead reside on a remote server. This is illustrated as function i 108 residing on a server system 110 that is accessible via network 112. As described below, the missing function i may be selected for separation from the rest of the program code based upon various considerations, including but not limited to an importance of the use of function 108 to a satisfying user experience, a difficulty of inferring an operation of the function 108 from an input/output analysis, any economic and/or computing resource costs associated with the remote hosting of the function 108, and other such considerations. While the missing function i is depicted as being stored on a remote server system, it will be understood that the missing function may be stored on any suitable remote computing device. Further, it will be understood that the term "server" as utilized herein may refer to any such remote computing device that hosts one or more missing functions.

Server system 110 comprises a factored function store 114 in which missing function i 108 is stored, and also comprises an authorized user information store 116 in which information on authorized users may be stored. As an example, FIG. 1 depicts a "user A license" 118, corresponding to the user of client A 102, as being stored on server system 110. In contrast, no license is stored for the unauthorized copy running on client B.

FIG. 1 also illustrates example communication between server system 110 and clients A and B. As client A executes the program code, upon reaching a point in code at which it needs to utilize the missing function 108, client A calls the missing function 108 at the server system 110 via network 112. Server system receives the call, determines that client A is running an authorized copy of the program code, and then executes the function and returns a result to client A. On the other hand, when client B calls the missing function 108, server system 110 determines that client B is not running an authorized copy of the program code, and does not execute missing function 110 and return a result to client B. In this case, various different failure modes are possible.

FIG. 1 also shows a developer computing device 120 comprising a factoring tool 122. The factoring tool 122 is implemented as code stored on the developer computing device that is executable by the developer computing device to automatically determine a list of potential functions in an application that are potentially suitable for factoring and placing on server system 110. In some embodiments, the factoring tool may instead reside partially or fully on server system 110, as shown at 124 and/or on a removable computer readable storage medium.

Factoring tool 122 is configured to receive an input of a representation of a program, and to analyze the representation of the program to identify candidate functions for factoring. As mentioned above, the factoring tool may be configured to make this determination based upon a balance of various factors. Such factors may include, but are not limited to, a difficulty of inferring the operation of the function from an input/output analysis, a relative importance of a function to the overall functionality of the program, and an effect of factoring a function on overall system performance and operating costs.

Factoring tool 122 further may be configured to output to a graphical user interface 126 on a display device 128 a list of one or more suggested candidate functions for factoring. User interface 126 may be configured to allow a developer to select a function displayed on the user interface to view the source code corresponding to that function. In this manner, a developer may view the list of suggested candidate functions, thereby allowing human validation of a final candidate function of the automatically produced list of candidates. This may help to avoid the selection of functions that appear from static and dynamic code analysis to be complex, but which in fact may be relatively easy to infer functionally from input/output analysis. One example of a function with a complex structure and operation with easy to infer functionality is a fast Fourier transform, as a sine wave input produces a simple spike output.

Figure 2:
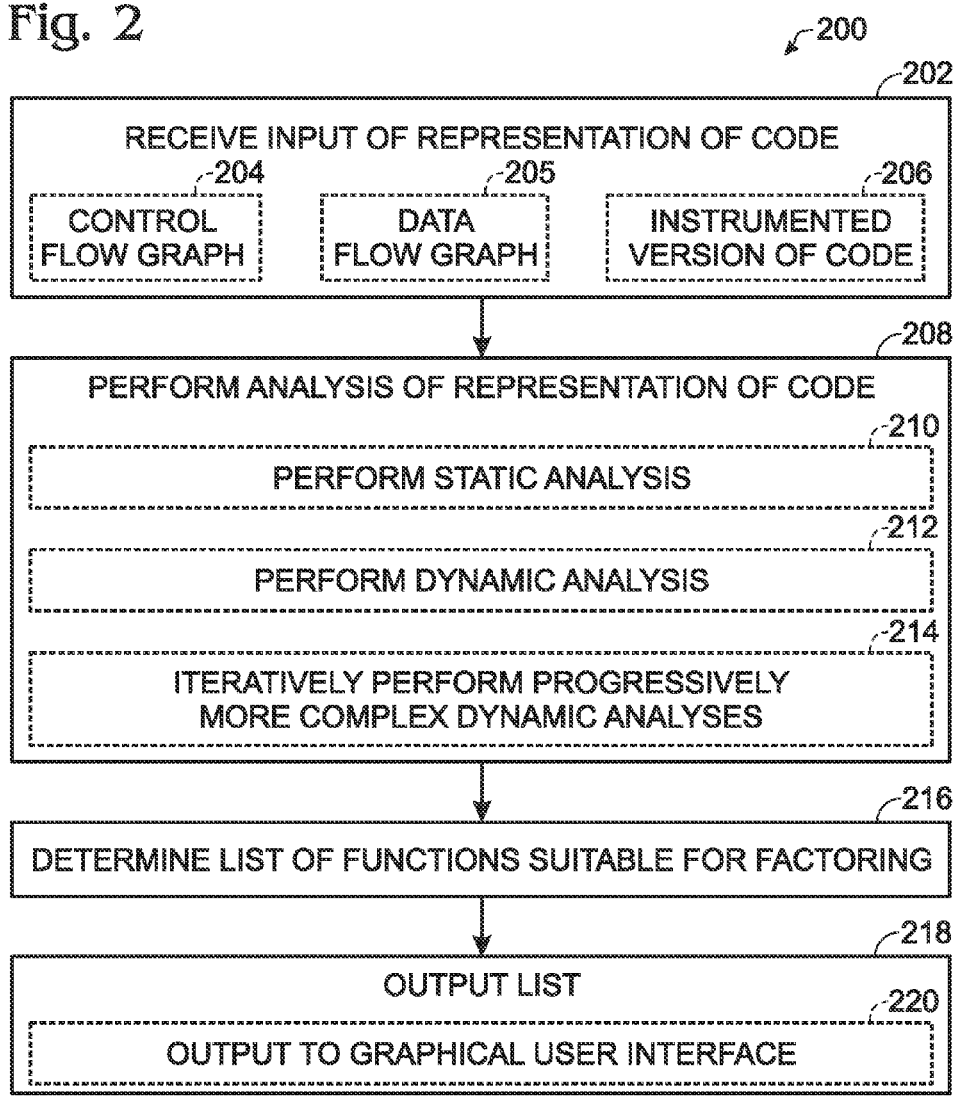
FIG. 2 shows an embodiment of a method of identifying factorable code in a program in such a manner as to balance performance and anti-piracy concerns.

FIG. 2 shows an example embodiment of a method 200 for determining, via a computing device, a factorable portion of code from a program to locate remotely from other portions of the program to hinder unauthorized use of the program. Method 200 comprises, at 202, receiving an input of a representation of the code of a program. Any suitable representation of the code may be used, depending upon the analyses to be run on the code. For example, where static code analysis is to be performed, the representation of the code may comprise a control flow graph 204, such as a call graph, a data flow graph 205, or any other suitable representation of the structure and functional dependencies of a program. It will be understood that the terms "control flow graph" and "data flow graph" as used herein may represent complete or incomplete graphs. Likewise, it will be more generally understood that the term "representation of the code" as used herein may signify either a representation of a complete set of code for a program, or an incomplete set of code for the program.

Likewise, where the analysis includes dynamic run-time analysis, the representation of the code may comprise an instrumented version of the code 206 to allow run-time data acquisition and analysis to be performed. Further, such as where both static and dynamic analyses are performed, both a control flow graph and an instrumented version of the code may be received as inputs, as well as any other suitable representations of the code. It will be understood that various known methods may be used to generate interprocedural control flow and data flow graphs of a program, and to instrument the code for a program, and as such are not discussed further herein.

Method 200 next comprises, at 208, performing analysis of the representation of the code to determine candidate functions for factoring. As mentioned above, the analysis may comprise static analysis performed via a control flow graph and/or a data flow graph of the code, as indicated at 210, and/or may also comprise dynamic analysis performed via an instrumented version of the code, as indicated at 212. In some embodiments, static analysis may first be performed to filter out less suitable functions via analysis of the functional interdependencies of the code to reduce the list of candidate functions from a global list to a subset of candidate functions, and then dynamic analysis may be performed on the subset of candidate functions to further narrow the list. This may help to identify candidate functions more easily than via the use of dynamic analysis alone, as the static analysis may utilize less computing resources than the dynamic analysis. It will be understood that static and dynamic analyses may be performed in any suitable order. For example, in some embodiments, a factoring analysis may interleave between dynamic and static analysis stages.

As indicated at 214, in some embodiments, multiple different dynamic analyses may be performed in a progressive manner such that progressively more computationally intensive functional analyses are performed. In this manner, less computationally intensive analyses can be performed on a list of functions obtained from the static analysis (or from the control flow graph) to filter the list down to a smaller number of functions. Then, more and more complex analyses may be performed as the list of candidate functions grows smaller and smaller through each analysis stage, thereby helping conserve computing resources compared to performing more computationally intensive analyses at earlier stages.

Any suitable method or methods may be used to statically and/or dynamically analyze the received code representations. For example, in some embodiments, various heuristics may be applied to help filter a collection of functions down to a list of candidate functions. This list of candidate functions may then be viewed by a developer familiar with the code as a final filtering step.

Some specific examples of heuristics that may be used to filter a group of functions to a list of candidate functions for factoring are as follows. It will be understood that these examples are presented for the purpose of illustration, and are not intended to be limiting in any manner. First, static analyses may be performed to determine, for each function of a plurality of functions, a number of basic functional blocks in the function, and to filter based upon a number of basic blocks in each function, as the operation of a function with a higher number of basic blocks may be more difficult to infer than the operation of a simpler function. Likewise, static analysis may be used to filter based upon how many times a function writes to memory. For example, functions that do not write to memory (or disk, and/or any other permanent store), or write to memory only a small number of times, and/or write to well defined data structures may be favored over functions that write to memory (or disk, and/or any other permanent store) a greater number of times. Additionally, static analysis may be used to identify any dead code (e.g. code that is not used by the rest of the program or is unreachable), and/or any code that otherwise may appear too simple or unimportant to overall program functionality for anti-piracy purposes.

Likewise, the factoring tool may perform static analysis to favor functions with outputs having a high number of dependencies in the control flow graph, and/or functions that affect a significant number of variables compared to other functions in at least one cut of the control flow graph. An impact of removing a function from the control flow graph may be characterized, for example, by normalizing a number of newly disconnected vertices in a data flow graph of the program as a result of removing the function. Various known heuristics, such as a max-cut heuristic, may be used to perform such an analysis.

As another example, static analysis may be used to determine an existence of recursive data dependencies (e.g. caused by loops and/or call graph recursions) in a function and/or a coverage of the function, as the functionality of code with a greater number of recursive dependencies and/or greater coverage may be more difficult to infer than one with a lesser number of recursive dependencies and/or a lesser coverage. In this instance, a greedy algorithm that detects natural loops may be used in this analysis. Further, in a loop-heavy program, filtering may be performed based upon the characteristics of the loops (e.g. the nature of loop-carried index variables). As yet another example, static analysis may be performed to remove functions that would place personally-identifiable information that comes from the client on the server.

Additionally, static analysis may involve determining, for each function of a plurality of functions, an amount of state that is passed to the function when it is called. In this manner, functions that involve the passing of greater amounts of state may be filtered, as such functions may have a greater detrimental effect on overall system performance. Also, semantic program knowledge, such as class structure, may be used in a static analysis, as class structure may provide information as to where important functionality is implemented. As yet a further example, static analysis may be used to determine the existence of elements of non-determinism, such as date/time and random number dependencies, third party calls, and the like. Then, filtering may be performed based upon whether a function contains such elements of non-determinism. As yet another example, static metrics of code, including but not limited to cyclomatic complexity, may be used in additional static analysis filtering steps.

Likewise, dynamic analysis may be performed in any suitable manner. In some dynamic analysis, an instrumented version of the program code received as an input into the factoring tool is run one or more times to gather statistics. For example, in the case of a video game, several runs of the video game, each following common paths within the video game, may be performed. Any suitable statistics may be gathered in this process. Examples include, but are not limited to, an average run time of each function of a plurality of function, an amount of state that is shared by and/or passed between functions, threading information (e.g. how often a function runs in a main thread), and a frequency at which a function is called. It will be understood that various runtime statistics, such as max/min and average runtime of a function, may be obtained from processor-level tools in some instances. Instrumented code also may be used to generate a data flow graph from observed traces in some embodiments.

In other embodiments, dynamic information about the execution of the program may be collected in any other suitable manner than the execution of instrumented code. Examples include via the use of a virtual machine, and via an emulation box (e.g. CPU mapping onto a network of field programmable gate arrays, etc.).

Based upon such statistics, various heuristics related to the run-time performance of the program may be applied to further filter candidate functions for factoring. For example, from a performance standpoint, it may be desirable to factor a function that is called less frequently instead of one that is called more frequently. Thus, more frequently called functions may be filtered out. Further, it may be desirable to filter out functions with short average runtimes, as such functions may be assumed to be too simple for effective anti-piracy. As a further example, where functions have portions that execute in a main thread, filtering may be configured to favor those functions in which the portions that execute in the main thread are called less frequently. Other information regarding threading also may be used for filtering. Additionally, as mentioned above, filtering may be configured to favor those functions in which shared and/or passed state is lower compared to where shared and/or passed state is higher.

As another example, entropy reduction heuristics may be utilized to identify a set of traces with shared segments that have different predecessors, and to filter based upon the number of different predecessors for the shared segments. Further, non-biased branches that increase the difficulty of branch prediction may be identified and favored in filtering. Additionally, functions in which a closed form of array indices is dependent upon conditionals may be identified and favored in filtering.

It will be understood that analyses that utilize performance heuristics may be impacted by the demand to have flexible timing on executing a function, and also by a desire for low bandwidth client-server communication. Therefore, to address such concerns, factoring tool 122 may be configured to favor selection of functions that increase a latency gap, that reduce a total size of shared and passed state, and that are not called too frequently.

A latency tolerance of a function may be determined in any suitable manner. In general, latency tolerance for a given function that accepts some input and produces some output may be estimated by determining when the input for the function is created and when the output from the function will be used. This may be expressed mathematically a difference between (a time when an output is used minus a time when an input is available) minus a time to execute the function. Determination of these values may be computationally complex. Thus, latency tolerance determinations and filtering may be performed in a later filtering step to reduce a number of functions on which the analysis is performed.

Other performance-based heuristics than latency tolerance also may be applied. For example, training traces of the program run while gathering statistics for dynamic analysis may be replayed to determine an effect on end user latency/experience. Then, filtering may be performed to exclude functions that cause a greater than desired increase to end user latency. Further, functions that do not utilize, or utilize relatively few, third-party communications on the part of the server, may be favored over functions that utilize greater numbers of third party calls.

Additionally, functions also may be filtered based upon heuristics related to a cost of hosting a function on a remote server. For example, it may be desirable to select a function that allows calls to the server to be batched (e.g. if it is observed on profile traces that the entry to the function is often preceded or followed by a network call). Alternatively, in such a case, the factored code may be expanded to include surrounding calls. Also, it may be desired to reduce a memory footprint of the factored code on the server. Thus, as mentioned above, the factoring tool may filter based upon how much state is passed to the server. Lesser amounts of shared state may have positive implications regarding such factors as including debugging and recovering from crashes. Further, where shared and/or passed state exists, it may be desirable to favor functions in which the passed and/or shared state is non-deterministic, and/or to favor functions that result in less power consumption by the server.

Continuing with FIG. 2, by performing the static and/or dynamic analyses of the representation of the code input into the factoring tool, a list of functions that may be potentially suitable for factoring and locating on a remote server is determined, as indicated at 216. Then, at 218 the list is output for review by a user. The list may be output, for example, to a graphical user interface 220 on a display device, or may be output to any other suitable device.

As described above, outputting the list to a graphical user interface may allow a developer to quickly review the list of candidate functions for factoring. Such a user interface also may allow a user to select a function to view the source code for the selected function. In this manner, functions that passed the automated filtering steps applied by the factoring tool but that have potentially easy-to-infer functionalities, such as a fast Fourier transform, may be recognized and rejected. Further, this may allow a person who is familiar with the code to select a function based upon an importance of the function to an end-user experience.

Figure 3:
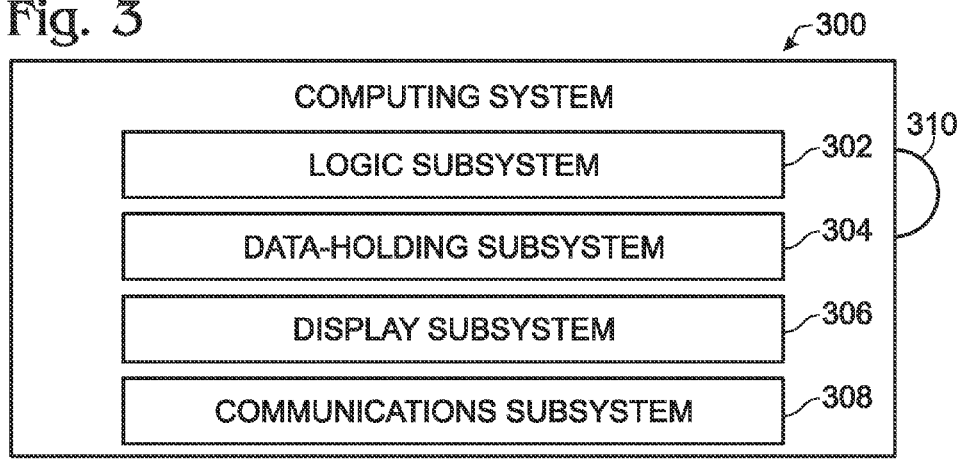
FIG. 3 shows a block diagram depicting an embodiment of a computing device.

As described above with reference to FIG. 1, the factoring tool is implemented in the form of a computer program configured to run on a computing device, and may run locally or remotely on a server. FIG. 3 schematically shows a nonlimiting computing system 300 that may perform one or more of the above described methods and processes. Computing system 300 may represent any of client A 102, client B 106, server system 110, and developer computing device 120 of FIG. 1.

Computing system 300 is shown in simplified form. It is to be understood that virtually any computer architecture may be used without departing from the scope of this disclosure. In different embodiments, computing system 300 may take the form of a mainframe computer, server computer, desktop computer, laptop computer, tablet computer, home entertainment computer, network computing device, mobile computing device, mobile communication device, gaming device, etc.

Computing system 300 includes a logic subsystem 302 and a data-holding subsystem 304. Computing system 300 may optionally include a display subsystem 306, communication subsystem 308, and/or other components not shown in FIG. 3. Computing system 300 may also optionally include user input devices such as keyboards, mice, game controllers, cameras, microphones, and/or touch screens, for example.

Logic subsystem 302 may include one or more physical devices configured to execute one or more instructions. For example, the logic subsystem 302 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 302 may include one or more processors that are configured to execute software instructions. Additionally or alternatively, logic subsystem 302 may include one or more hardware or firmware logic machines configured to execute hardware or firmware instructions. Processors of logic subsystem 302 may be single core or multicore, and the programs executed thereon may be configured for parallel or distributed processing. The logic subsystem may optionally include individual components that are distributed throughout two or more devices, which may be remotely located and/or configured for coordinated processing. One or more aspects of logic subsystem 302 may be virtualized and executed by remotely accessible networked computing devices configured in a cloud computing configuration.

Data-holding subsystem 304 may include one or more physical, non-transitory, devices configured to hold data and/or instructions executable by logic subsystem 302 to implement the herein described methods and processes. When such methods and processes are implemented, the state of data-holding subsystem 304 may be transformed (e.g., to hold different data).

Data-holding subsystem 304 may include removable media and/or built-in devices. Data-holding subsystem 304 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 304 may include devices with one or more of the following characteristics: volatile, nonvolatile, dynamic, static, read/write, read-only, random access, sequential access, location addressable, file addressable, and content addressable. In some embodiments, logic subsystem 302 and data-holding subsystem 304 may be integrated into one or more common devices, such as an application specific integrated circuit or a system on a chip.

FIG. 3 also shows an aspect of the data-holding subsystem in the form of removable computer-readable storage media 310, which may be used to store and/or transfer data and/or instructions executable to implement the herein described methods and processes. Removable computer-readable storage media 310 may take the form of CDs, DVDs, HD-DVDs, Blu-Ray Discs, EEPROMs, and/or floppy disks, among others.

The term "program" may be used to describe an aspect of computing system 300 that is implemented to perform one or more particular functions. In some cases, such a program may be instantiated via logic subsystem 302 executing instructions held by data-holding subsystem 304 It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The term "program" and "engine" is meant to encompass individual or groups of executable files, data files, libraries, drivers, scripts, database records, etc.

Display subsystem 306 may be used to present a visual representation of data held by data-holding subsystem 304. As the herein described methods and processes change the data held by the data-holding subsystem, and thus transform the state of the data-holding subsystem, the state of display subsystem 306 may likewise be transformed to visually represent changes in the underlying data. Display subsystem 306 may include one or more display devices utilizing virtually any type of technology. Such display devices may be combined with logic subsystem 302 and/or data-holding subsystem 304 in a shared enclosure, or such display devices may be peripheral display devices.

When included, communication subsystem 308 may be configured to communicatively couple computing system 308 with one or more other computing devices. Communication subsystem 308 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 300 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method implemented by a computing device, the method comprising:
    obtaining a representation of code of a program having multiple functions;
    performing analysis on the representation of the code to identify a list of one or more candidate functions from the multiple functions of the program, wherein the list of one or more candidate functions are determined from the analysis to be candidates for locating remotely from a remainder of the code of the program; and
    outputting the list of one or more candidate functions determined from the analysis to be candidates for locating remotely from the remainder of the code of the program,
    wherein performing the analysis on the representation of the code comprises filtering out certain functions of the multiple functions having relatively fewer recursive data dependencies than other functions that remain in the list of one or more candidate functions after the filtering.

2. The method of claim 1, wherein performing the analysis on the representation of the code comprises filtering out other functions of the multiple functions based on coverage of the other functions.

3. The method of claim 1, wherein performing the analysis on the representation of the code comprises, for the multiple functions of the program, determining amounts of state data that are passed to the multiple functions when called, and performing additional filtering of further functions of the multiple functions from the list of one or more candidate functions based upon the amounts of state data that are passed when the further functions are called.

4. The method of claim 1, wherein performing the analysis on the representation of the code comprises dynamically determining frequencies at which the multiple functions are called in an instrumented version of the code, and performing additional filtering of further functions of the multiple functions from the list of one or more candidate functions based upon the frequencies.

5. The method of claim 1, wherein performing the analysis on the representation of the code comprises determining how frequently individual functions of the multiple functions execute in a main thread of the program, and performing additional filtering of further functions of the multiple functions from the list of one or more candidate functions based upon frequencies at which the further functions execute in the main thread.

6. The method of claim 1, wherein performing the analysis on the representation of the code comprises, for the multiple functions, determining associated latency tolerances based upon differences between first times when outputs of the multiple functions are used minus second times when inputs into the multiple functions are available compared to durations of execution of the multiple functions.

7. The method of claim 1, wherein performing the analysis of the representation of the code comprises first performing static analysis to select a subgroup of the multiple functions from a global list of the multiple functions, and then performing dynamic analysis to filter the subgroup of the multiple functions.

8. A computer-readable memory device comprising instructions stored thereon that are executable by a computing device to cause the computing device to perform acts comprising:
    receiving a control flow graph of an application program and an instrumented version of code of the application program, the application program having multiple functions;
    performing static analysis of the control flow graph of the application program;
    based on the static analysis, performing a first filtering of the multiple functions to identify a list of candidate functions that are candidates for remote execution, wherein the first filtering is based at least in part on whether the multiple functions place personally-identifiable information on a remote computing device configured to perform the remote execution;
    performing dynamic analysis of the instrumented version of the code of the application program;
    based on the dynamic analysis, performing a second filtering of the list to remove at least some candidate functions from the list; and
    outputting the list of candidate functions after the first filtering based on the static analysis and the second filtering based on the dynamic analysis.

9. A computing device, comprising:
    one or more processing devices; and
    one or more memory devices having machine-readable instructions stored thereon that, when executed by the one or more processing devices, configure the one or more processing devices to:
        receive an input of a control flow graph representing code of a program;
        receive another input of an instrumented version of the code;
        perform static analysis of the code based upon the control flow graph;
        determine a subset of functions of the program based upon the static analysis;

using the instrumented version of the code, iteratively perform dynamic analysis on the subset of functions to determine a list of functions potentially suitable for factoring; and output the list of functions potentially suitable for factoring, wherein the dynamic analysis is performed iteratively via progressively more computationally-intensive iterations of the dynamic analysis and filtering individual functions of the program from the list after the iterations of the dynamic analysis.

10. The computing device of claim 9, wherein the machine-readable instructions further cause the one or more processing devices to:

receive a user input selecting a selected function from the list of one or more functions, and, in response, output source code for the selected function.

11. The method of claim 1, further comprising configuring one or more individual candidate functions to execute on a server device and configuring the remainder of the code to execute on a client device.

12. The method of claim 1, wherein the analysis comprises static analysis of the representation of the code.

13. The method of claim 1, further comprising:

receiving a user input selecting a selected function from the list of one or more candidate functions, and in response to the user input, outputting source code for the selected function.

14. The method of claim 1, wherein obtaining the representation of the code of the program comprises receiving one or more of a control flow graph representing the code, a data flow graph representing the code, and an instrumented version of the code.

15. The method of claim 1, wherein performing the analysis on the representation of the code comprises performing additional filtering of further functions of the multiple functions from the list of one or more candidate functions based upon a number of basic blocks in the further functions.

16. The method of claim 1, wherein performing the analysis on the representation of the code comprises performing additional filtering of further functions of the multiple functions from the list of one or more candidate functions based upon a number of times that the further functions write to memory.

17. The computer-readable memory device of claim 8, wherein the dynamic analysis is performed by running the application program multiple times and gathering data from instrumentation in the instrumented version of the code.

18. The computer-readable memory device of claim 8, wherein the acts further comprise:

receiving an input selecting a selected function from the list of candidate functions, and in response to the input, outputting source code for the selected function.

19. The computer-readable memory device of claim 8, wherein the first filtering comprises filtering out certain functions of the multiple functions based on whether the certain functions affect a significant number of variables compared to other functions of the multiple functions.

20. The computer-readable memory device of claim 19, wherein the first filtering comprises performing at least one cut of the control flow graph to filter out the certain functions.

* * * * *